Nov. 11, 1941.    L. G. ROGERS    2,261,943
DRIER
Filed July 23, 1940    2 Sheets-Sheet 1
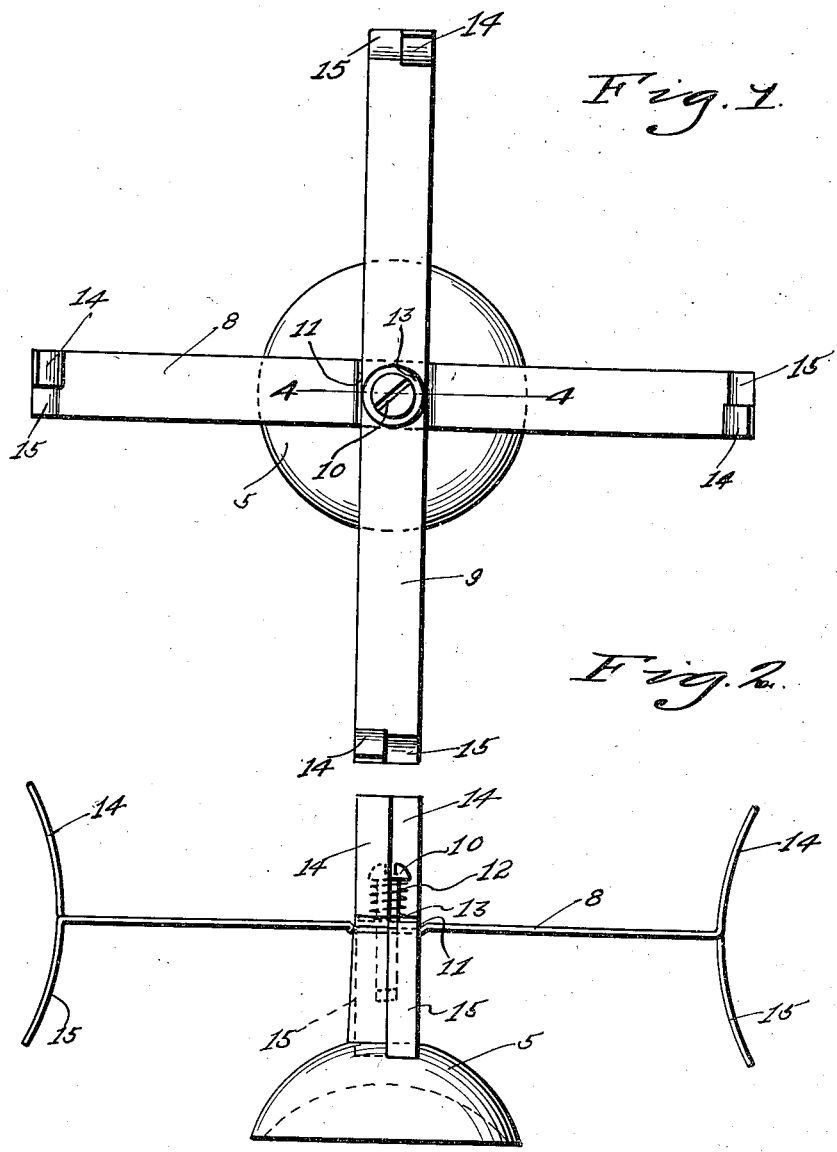
Inventor
Lynn G. Rogers
By Clarence A. O'Brien
Attorney Nov. 11, 1941.                L. G. ROGERS                2,261,943
                                  DRIER
                           Filed July 23, 1940            2 Sheets-Sheet 2
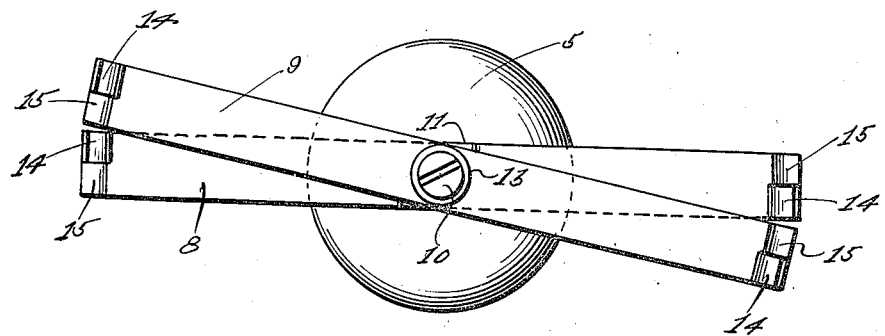
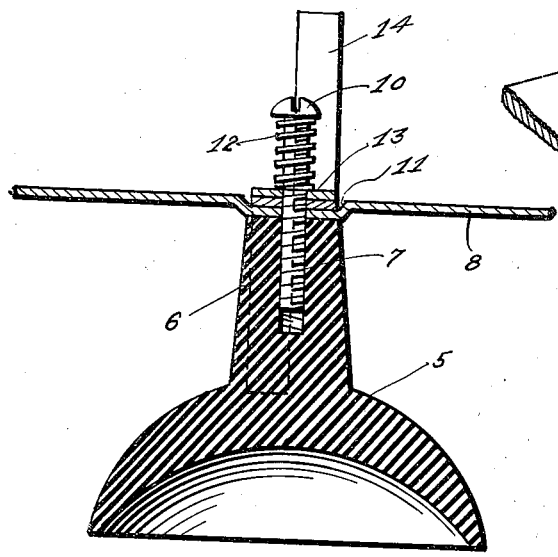
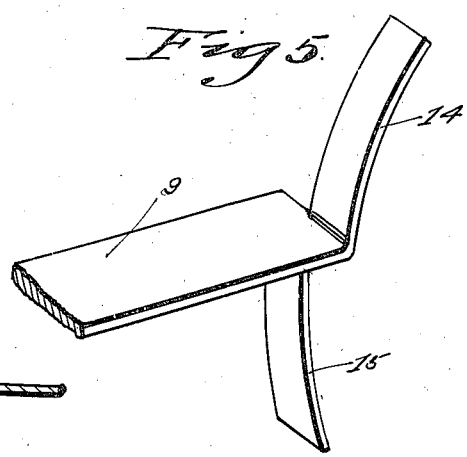
Inventor
Lynn G. Rogers
By Clarence A. O'Brien
Attorney Patented Nov. 11, 1941

2,261,943

UNITED STATES PATENT OFFICE 2,261,943

DRIER

Lynn G. Rogers, Flint, Mich.

Application July 23, 1940, Serial No. 347,058

1 Claim. (Cl. 242—104)

This invention relates to a device to facilitate the drying of fish lines, and an object of the invention is to provide a device of this character consisting of comparatively few parts, which can be readily assembled and disassembled; is foldable; and may be readily secured on a fixed support; the device being further equipped as to insure thorough drying of the fish line within a relatively short period of time.

The invention together with its objects and advantages will be best understood from a study of the following description taken in connection with the accompanying drawings, wherein—

Figure 1 is a plan view of the drier extended for use.

Figure 2 is a side elevational view thereof.

Figure 3 is a plan view of the drier with the arms thereof in folded position.

Figure 4 is a vertical sectional view taken substantially on the line 4—4 of Figure 1, and Figure 5 is a perspective view of one end portion of an arm forming part of the invention.

Referring more in detail to the drawings, it will be seen that in the preferred embodiment thereof the drier comprises a support 5 in the form of a rubber vacuum cup which may be readily applied to some stationary support on which it is desired to place and affix the drier when the latter is in use.

The cup 5 is formed with an integral stem 6 that is preferably of rubber and is provided with an axial threaded socket 7.

Further in accordance with the present invention I have provided two arms 8 and 9 respectively, and these arms are crossed at their centers and pivoted to the stem 6 through the medium of a bolt 10, the shank of which threads into the socket 7, as shown in Figure 4; the arms 8 and 9 at the center thereof being suitably apertured to accommodate the bolt 10.

Intermediate its ends the arm 8 is provided with a groove 11 that accommodates the intermediate portion of the arm 9 with the sides of the groove forming abutments acting to normally hold the arms in the extended crossed position shown in Figure 1.

Also disposed on the bolt 10 is a spring 12 that impinges at one end thereof against the head of the bolt 10 and at an opposite end thereof against a washer 13 that seats on the arm 9 as shown in Figure 4.

Obviously, by merely adjusting the bolt 10 relative to the stem 6, tension on the spring 12 may be adjusted.

Also each of the arms 8 and 9 at each end thereof is split longitudinally for a reasonable portion of its length, and the portions of the arms at the respective slitted ends thereof are bent in reverse directions and longitudinally curved to provide at each end of each arm an upwardly extending finger 14 and a downwardly extended finger 15.

When in use the arms 8 and 9 are in the extended position shown in Figure 1 and the line coiled on the device in an obvious manner, the convolutes of the coiled line engaging the concave faces of the fingers 14 and 15.

When not in use the arm 9 against the action of the spring 12 is moved out of seated position in the notch 11 and swung relative to the arm 8 to the position shown in Figure 3, which may be described as the folded position of the drier.

From the foregoing it will be seen that I have provided a simple and inexpensive drier for lengths of string, and that the same will be found particularly useful by fishermen in drying out fish lines.

Though I have herein shown and described the preferred embodiment of the invention, it is to be understood that the same is susceptible of further changes, modifications and improvements coming within the scope of the appended claim.

Having thus described the invention, what is claimed as new is—

In a drier of the character described, a supporting member, a pair of crossed arms pivoted at their center to said support, each of said arms being provided at its respective opposite ends with longitudinally extending slits, each slit dividing an end portion of the arm to form a pair of fingers, one finger being curved upwardly and outwardly and the other finger being curved downwardly and outwardly.

LYNN G. ROGERS.